(12) United States Patent
Jones

(10) Patent No.: US 12,370,389 B1
(45) Date of Patent: Jul. 29, 2025

(54) METHOD FOR FIGHTING FOREST FIRES AND/OR WILDFIRES

(71) Applicant: Johnny Jones, Cincinnati, OH (US)

(72) Inventor: Johnny Jones, Cincinnati, OH (US)

( * ) Notice: Subject to any disclaimer, the term of this patent is extended or adjusted under 35 U.S.C. 154(b) by 746 days.

(21) Appl. No.: 17/727,269

(22) Filed: Apr. 22, 2022

Related U.S. Application Data

(60) Provisional application No. 63/178,394, filed on Apr. 22, 2021.

(51) Int. Cl.
*A62C 3/02* (2006.01)
*A01G 23/095* (2006.01)
*A01G 23/083* (2006.01)

(52) U.S. Cl.
CPC .......... *A62C 3/0278* (2013.01); *A01G 23/095* (2013.01); *A01G 23/083* (2013.01)

(58) Field of Classification Search
CPC ........ A01G 23/02; A01G 23/095; A01G 3/08; A01G 3/085; A01G 3/086; A01G 3/088; A62C 3/02; A62C 3/0278
See application file for complete search history.

(56) References Cited

U.S. PATENT DOCUMENTS

| | | | |
|---|---|---|---|
| 7,975,735 B2 * | 7/2011 | Bergeron | A01G 23/02 144/34.1 |
| 11,573,570 B2 * | 2/2023 | Gregory | G05D 1/248 |

OTHER PUBLICATIONS

Wildland Fire Suppression Tactics Reference Guide , National Wildfire Coordinating Group, Apr. 1996 (Year: 1996).*
Wildland Fire Management Reference Manual 18, Jan. 1, 2008 (Year: 2008).*
NWCG Standards for Wildland Fire Chainsaw Operations, National Wildfire Coordinating Group, Jun. 2022 (Year: 2022).*
Burke et al., "The changing risk and burden of wildfire in the United States", Proceedings of the National Academy of Sciences (PNAS), vol. 118, No. 2, Jan. 11, 2021, pp. 1-6.
Di Tipping-Woods, "World on fire", World Wildlife Federation (WWF), Fall 2020, Web page: <https://www.worldwildlife.org/magazine/issues/fall-2020/articles/world-on-fire 11/>, pp. 1-11.
Ron Brackett, "Wildfire Smoke Makes Up Half of Small Particle Pollution in Western U.S., Study Finds", Website: <https://www.msn.com>, dated Jan. 14, 2021, pp. 1-7.

* cited by examiner

*Primary Examiner* — Matthew Katcoff
(74) *Attorney, Agent, or Firm* — The Law Office of Patrick F. O'Reilly III, LLC

(57) ABSTRACT

A method for fighting forest fires and/or wildfires is disclosed herein. The method comprising the steps of: airlifting equipment and operators to a location of a fire; establishing one or more fire lines and one or more work areas at the location of the fire; cutting down the vegetation along the one or more fire lines by using a first subset of the equipment; transporting the cut vegetation to a selected one of the one or more work areas using a second subset of the equipment; processing and/or storing the cut vegetation in the one or more work areas prior to the cut vegetation being transported off-site for use; and transporting the cut vegetation from the one or more work areas to one or more off-site locations so that the cut vegetation is able to be used by consumers for a variety of different applications.

15 Claims, 15 Drawing Sheets

METHOD FOR FIGHTING FOREST FIRES AND/OR WILDFIRES

CROSS-REFERENCE TO RELATED APPLICATIONS

This patent application claims priority to, and incorporates by reference in its entirety, U.S. Provisional Patent Application No. 63/178,394, entitled "Fighting forest fires and wildfires", filed on Apr. 22, 2021.

STATEMENT REGARDING FEDERALLY SPONSORED RESEARCH OR DEVELOPMENT

Not Applicable.

NAMES OF THE PARTIES TO A JOINT RESEARCH AGREEMENT

Not Applicable.

INCORPORATION BY REFERENCE OF MATERIAL SUBMITTED ON A COMPACT DISK

Not Applicable.

BACKGROUND OF THE INVENTION

1. Field of the Invention

The invention generally relates to fighting forest fires and/or wildfires. More particularly, the invention relates to a method for fighting forest fires and/or wildfires that establishes a fire control line over a large area quickly and more efficiently than the current techniques.

2. Background

Forest fires and wildfires are the greatest threat to our environment and are destroying our precious resources-only adding to global warming. In fact, a recent study published in "Proceedings of the National Academy of Sciences" and reported by MSN early in 2021 states that the contribution of wildfire smoke in the U.S. has grown substantially since the mid-2000s. An article in the fall 2020 issue of World Wildlife Federation (WWF) states that over 20 million acres were lost due to fires in California, Australia, and Russia among other locations.

Forest fire fighting today consists of a well-trained team of firefighters and is accompanied by airplanes and helicopters to drop chemical retardants and water on a small hotspot or section of fire at a time, then they must return to replenish their supplies. This takes time. Meanwhile on the ground a small army of firefighters are equipped with fire extinguishers and shovels to cover burning brush with dirt and chemical spray. The use of water is a temporary measure. In time, water will evaporate and a fire can easily reignite. This conventional firefighting technique eventually works, but is highly inefficient. Another technique currently uses explosives to clear brush and fallen trees, and also to fell trees that are determined to potentially allow a fire to jump across a fire line. This technique is typically used to build a fire line quickly to contain a fast-moving fire. These are just the types of situations that need to be replaced with more efficient and effective methods. In fact, a more efficient and effective way must be found overall to aid fire fighters in their duty to bring fires under control.

Overall, the current methods for fighting particularly large-scale forest fires and wildfires are extremely slow and ineffective, thus allowing a fire to burn over large areas before it is finally brought under control.

Therefore, what is needed is a better method to attack fires so they can be brought under control much sooner thus saving lives of humans and wildlife, saving property (homes, businesses, entire communities), and saving habitat (trees, forest, wild lands) and more. Because forest fires and wildfires occur in a variety of terrains, different methods are needed for effectively fighting fires that work in various terrains.

BRIEF SUMMARY OF EMBODIMENTS OF THE INVENTION

Accordingly, the present invention is directed to a method for fighting forest fires and/or wildfires that substantially obviates one or more problems resulting from the limitations and deficiencies of the related art.

In accordance with one or more embodiments of the present invention, there is provided a method for fighting forest fires and/or wildfires. The method comprises the steps of: (i) airlifting equipment and operators to a location of a fire, at least some of the equipment comprising attachment rings or hooks attached to the equipment for facilitating transport of the equipment by aircraft; (ii) establishing one or more fire lines at the location of the fire, the one or more fire lines configured to be cleared of vegetation using the equipment so as to slow or stop the progress of the fire; (iii) establishing one or more work areas at the location of the fire, the one or more work areas configured to be used for processing the vegetation after the vegetation has been cut in the one or more fire lines, the one or more work areas being spaced apart from the one or more fire lines so that one or more work areas are not impacted by the fire; (iv) cutting down the vegetation along the one or more fire lines by using a first subset of the equipment; (v) after the vegetation is cut down along the one or more fire lines, transporting the cut vegetation to a selected one of the one or more work areas using a second subset of the equipment; (vi) processing and/or storing the cut vegetation in the one or more work areas prior to the cut vegetation being transported off-site for use; and (vii) transporting the cut vegetation from the one or more work areas to one or more off-site locations so that the cut vegetation is able to be used by consumers for a variety of different applications.

In a further embodiment of the present invention, the fire being managed and treated by the operators comprises a forest fire, and the step of cutting down the vegetation along the one or more fire lines further comprises cutting down trees along the one or more fire lines using the first subset of the equipment.

In yet a further embodiment, the first subset of the equipment comprises forestry equipment, the forestry equipment being selected from the group consisting of: (i) one or more feller bunchers for cutting down and collectively grasping cut trees, (ii) one or more grapple skidders for grabbing and moving a bunch of cut trees, (iii) one or more loader forwarders for grabbing and lifting cut trees for transport, (iv) one or more excavators fitted with combination cutter and delimber heads, (v) one or more tractors for moving cut trees, and (vi) combinations thereof.

In still a further embodiment, the step of transporting the cut vegetation to the selected one of the one or more work areas further comprises transporting the cut trees to the selected one of the one or more work areas using the second subset of the equipment, the second subset of the equipment being selected from the group consisting of: (i) one or more grapple skidders for grabbing and moving a bunch of cut trees, (ii) one or more loader forwarders for grabbing and lifting cut trees for transport, (iii) one or more tractors for moving cut trees, and (iv) combinations thereof.

In yet a further embodiment, the step of processing and/or storing the cut vegetation in the one or more work areas further comprises delimbing and cutting the cut trees into sections using a third subset of the equipment, the third subset of the equipment being selected from the group consisting of: (i) one or more limbing machines for removing limbs from the cut trees, (ii) stroke delimbers for removing limbs from the cut trees, (iii) one or more feller bunchers for cutting and collectively grasping cut trees, (iv) one or more grapple skidders for grabbing and moving a bunch of cut trees, (v) one or more loader forwarders for grabbing and lifting cut trees for transport, (vi) one or more excavators fitted with combination cutter and delimber heads, (vii) one or more tractors for moving cut trees, and (viii) combinations thereof.

In still a further embodiment, the step of processing and/or storing the cut vegetation in the one or more work areas further comprises grinding tree branches, leaves, and other debris from the cut trees that cannot be used for wood products using one or more wood chippers so as to turn the tree branches, leaves, and other debris into mulch that is able to loaded into trucks, and removed from the one or more work areas.

In yet a further embodiment, the method further comprises the step of: after the trees are cut down along the one or more fire lines and transported to the one or more work areas, removing the stumps along the one or more fire lines with one or more stump grinding devices so that the ground along the one or more fire lines is able to be more easily plowed.

In still a further embodiment, the method further comprises the step of: after the trees are cut down along the one or more fire lines and transported to the one or more work areas, turning over the ground soil along the one or more fire lines using one or more plows so as to bury any remaining vegetation and combustible material to reduce a likelihood of the forest fire advancing beyond the fire line.

In yet a further embodiment, the fire being managed and treated by the operators comprises a wildfire, and the step of cutting down the vegetation along the one or more fire lines further comprises cutting down ground cover along the one or more fire lines using the first subset of the equipment.

In still a further embodiment, the first subset of the equipment comprises mowing equipment, the mowing equipment being selected from the group consisting of: (i) one or more rotary mowers for cutting down the ground cover, (ii) one or more rotary cutters for cutting down the ground cover, and (iii) combinations thereof.

In yet a further embodiment, the method further comprises the steps of: after the ground cover is cut down along the one or more fire lines, collecting the cut ground cover into rows using one or more hay rakes; and forming the cut ground cover into bales using balers so that the bales are able to be easily removed from the one or more fire lines.

In still a further embodiment, the step of transporting the cut vegetation to the selected one of the one or more work areas further comprises transporting the bales of the cut ground cover to the selected one of the one or more work areas using the second subset of the equipment, the second subset of the equipment being selected from the group consisting of: (i) one or more hay wagons, (ii) one or more flatbed trucks, (iii) another type of transport vehicle capable of transporting the bales of the cut ground cover, and (vi) combinations thereof.

In yet a further embodiment, the method further comprises the step of: after the bales of the cut ground cover are transported to the one or more work areas, turning over the ground soil along the one or more fire lines using one or more plows so as to bury any remaining vegetation and combustible material to reduce a likelihood of the wildfire advancing beyond the fire line.

In still a further embodiment, the fire being managed and treated by the operators comprises a combination of the wildfire and a forest fire; and the step of cutting down the vegetation along the one or more fire lines further comprises cutting down trees along the one or more fire lines; the step of transporting the cut vegetation to the selected one of the one or more work areas further comprises transporting the cut trees to the selected one of the one or more work areas; and the step of processing and/or storing the cut vegetation in the one or more work areas further comprises delimbing and cutting the cut trees into sections.

In yet a further embodiment, the method further comprises the step of: transporting firefighters and firefighting equipment to the location of the fire using high mobility multipurpose wheeled vehicles to accelerate the forming of the one or more fire lines at the location of the fire.

It is to be understood that the foregoing general description and the following detailed description of the present invention are merely exemplary and explanatory in nature. As such, the foregoing general description and the following detailed description of the invention should not be construed to limit the scope of the appended claims in any sense.

BRIEF DESCRIPTION OF THE SEVERAL VIEWS OF THE DRAWINGS

The invention will now be described, by way of example, with reference to the accompanying drawings, in which.

Throughout the figures, the same elements are always denoted using the same reference characters so that, as a general rule, they will only be described once.

DETAILED DESCRIPTION OF EMBODIMENTS OF THE INVENTION

Figure 1:
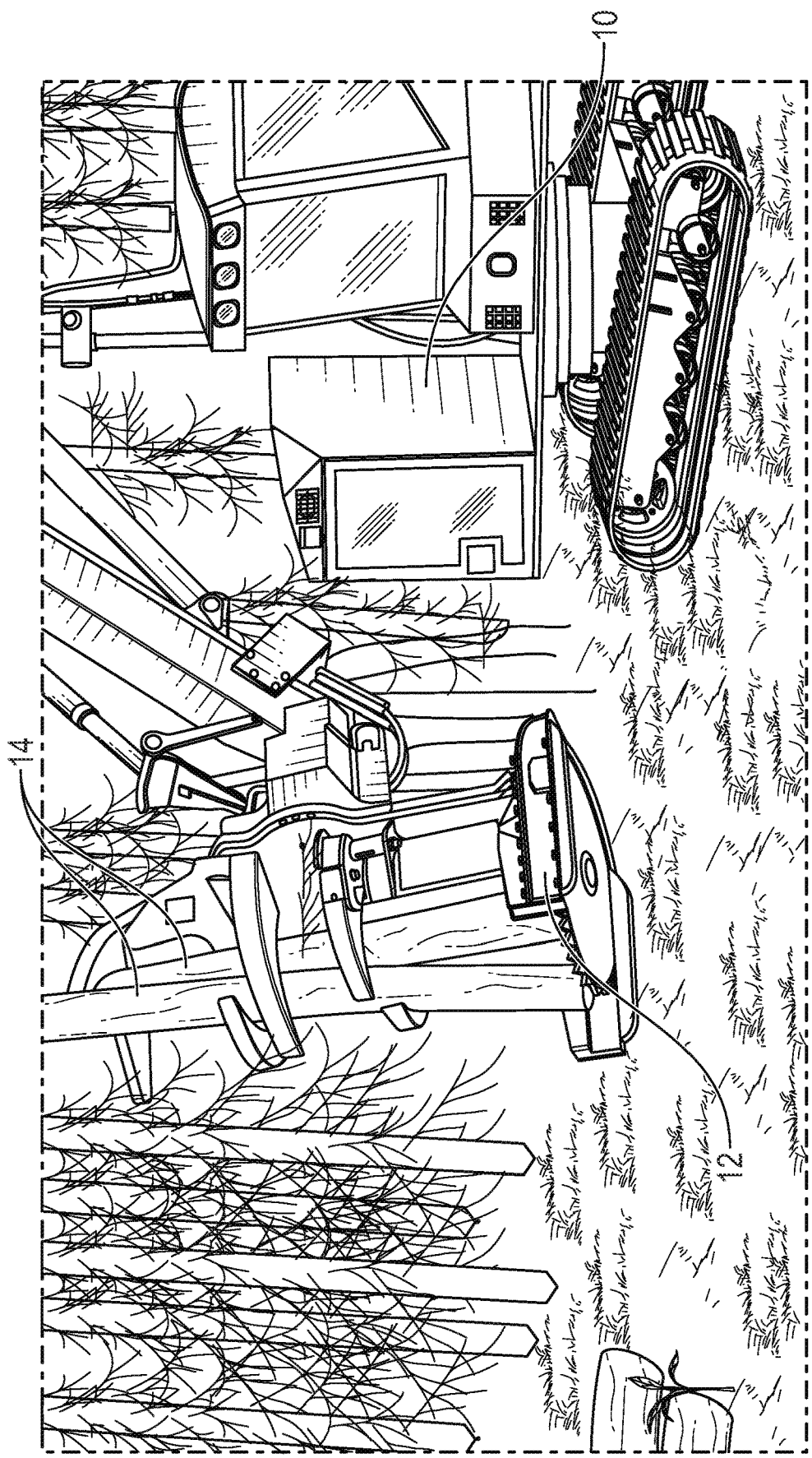
FIG. 1 is a perspective view depicting a feller buncher for cutting down and collectively grasping cut trees.

In one or more embodiments described hereinafter, a method for fighting forest fires and/or wildfires establishes a control line over a large area quickly and more efficiently than the current techniques. For example, for a fire on somewhat flat terrain, if all the fuel (i.e., trees, ground cover, other vegetation) in the area where the fire is predicted to go is removed for a width of about 300 feet (the numbers used here are just for illustration purposes) using some very versatile equipment-equipment recommended to be used in this disclosed embodiments, the fire can be stopped from advancing beyond that point and will burn itself out or at least can be contained and managed using more conventional methods.

In one or more embodiments, the following preliminary steps need to be performed before a fire-fighting team can determine how best to proceed using the methods detailed herein:

1. Assemble a team of experts in the various areas needed to handle a particular fire scenario. These specialists include experienced fire-fighting experts, experts in forestry equipment and local forestry experts—for help in fighting forest fires, experts in farming equipment—for assistance with equipment for clearing fields, weather forecasting experts to predict wind direction and other weather-related matters that affect the direction the fire is moving, aerial surveillance experts to put "eyes in the skies" to provide real-time updates on fire status.
2. Assess the situation for the best place(s) to establish fire/control lines.
3. Since fires burn outward from a central starting point or points, decide how best to surround and contain the fire given existing natural barriers, inaccessible terrain, weather, size of fire, etc. Determine if measures need to be developed for multiple containment locations (control lines). The on-site experts will best access this situation and determine how to proceed.
4. Determine what types of terrain the fire containment methods are facing. The types of terrain involved will influence the decisions about what type of equipment to use, how many machines can operate simultaneously (as a cluster) to clear a larger area for the fire line, etc. (see step 6 below).
5. Determine how soon the equipment needed to clear land can be made available along with operators.
6. Modify the equipment being brought to the fire site with lifting hooks or rings to accommodate having the equipment safely airlifted to the fire containment zones.
7. Develop protocols for ensuring the safety of firefighters and equipment operators.

In one or more embodiments, there are basically three (3) types of fires to be fought: (i) a forest fire; (ii) a wildfire (brush fires, prairie fires, etc.)—basically any location with no or limited trees, i.e., open areas; and (iii) a fire in a combination of forest and open areas. As described in the embodiments hereinafter, for each of these types of fires, there is provided is a further description of what are the most appropriate types of equipment to remove the "fuel" for the fire in that terrain—where the fuel is anything that can burn, i.e., brush, trees, any vegetation that keeps the fire burning—and establish a fire line (or set of fire lines). Also included are the action steps along with use of the various types of equipment.

A. Fighting a Forest Fire

In one or more embodiments, the illustrative steps described below are used to fight a forest fire. Even if not expressly stated herein, the steps below apply to situations where there is one or more fire lines being established.

1. Assess the area for the best place(s) to establish a fire line or multiple locations for fire lines as needed.
2. When creating a fire line or multiple lines, determine the types of tree harvesting and other equipment needed using a team of tree harvesting experts and local forestry experts in addition to the firefighting team leads.
3. Set up work areas for delimbing and cutting the trees into sections. All work areas are to be established in safe zones away or separate from the fire lines. Arrange to have the appropriate equipment brought onsite to the various areas. This equipment needs to have been modified with lifting hooks or rings (e.g., D-ring shackles) welded on to facilitate airlifting the equipment directly to the needed locations.
4. Cut the trees down in the fire line area(s) and move them to a work area as soon as they are cut down so the fire line can be cleared more quickly. Multiple work areas may be necessary depending on the size of the fire, the number of fire lines being established and/or distance between the fire lines. All-terrain vehicles may be used for transporting people and small pieces of equipment more quickly. Preferably, all-terrain vehicles in the form of high mobility multipurpose wheeled vehicles (Humvees) are used. Advantageously, high mobility multipurpose wheeled vehicles have the ability to operate effectively in a variety of off-road conditions, thus enhancing the transport and rescue capabilities of fire fighters on the front lines.
5. In the work area(s), the felled trees are delimbed and cut into sections. All trees once delimbed and cut will be stacked for later removal.
6. All branches that can be used for wood products can also later be loaded onto trucks and removed.
7. Small limbs, branches, twigs, etc. that cannot be used for wood products are to be run through a wood chipper to turn into mulch and/or loaded into trucks for removal.

8. Tree stumps can be dug up and moved to the work area to be disposed of or shredded for removal.
9. If the tree stumps are removed, plows are to be brought in to plow under the remaining ground cover in the fire line area(s) leaving only dirt so there is nothing left to burn or restart the fire. This completes the process of establishing a fire line in the illustrative embodiment.

In the illustrative embodiment, harvesting/saving trees during a forest fire is highly advantageous because it repurposes the wood, while also removing potential fuel for the forest fire to spread. In one or more embodiments, forestry equipment operators and fire fighters receive specific cross-training or other direction/oversight to establish guidelines for the most effective execution of the innovative firefighting techniques described herein (i.e., teamwork).

In the illustrative embodiment, step 1 listed above involves determining the best place to establish a fire line—or locations if multiple fire lines are needed. This process includes considering all the components of the attack strategy, how much time is available, how big is the area, etc. Step 2 listed above involves determining the types of tree harvesting and other equipment needed to establish effective fire lines—with the assistance of a team of tree harvesting experts, local forestry exports and firefighting leaders. In the illustrative embodiment, for tree harvesting, the functional steps are: (i) cutting the tree at the base and grabbing it so the felling is controlled, (ii) stripping the branches from the tree trunk, and (iii) cutting the tree trunk into useable sections (cut to length) for transport to a lumber mill or other processing facility. A harvester head is capable of preforming all three of these functions. Other equipment may be used that performs each function separately—or two of the three functions. In one or more embodiments, separately functioning pieces of tree harvesting equipment are used to speed up the process of clearing the fire line areas of trees. Equipment selection includes considerations, such as the quantity of each type of equipment—this could mean a quantity of up to 5 to 10 of a specific type of equipment and that means for each concurrent fire line clearing operation.

In the illustrative embodiment, the following types of equipment may be used for the particular functions listed:
  i. For harvesting trees, a harvester (tracked or wheeled), a feller buncher (tracked or wheeled), a harvester head attached to an arm and cab, and/or directional feller may be used.
  ii. For delimbing cut down trees and cutting trees once delimbed, a limbing machine and/or a stroke delimber may be used.
  iii. For moving felled trees, a grapple skidder and/or heavy tractor may be used.
  iv. For lifting/grabbing cut trees for transport, a loader and/or forwarder may be used.
  v. For processing treetops and branches, a wood chipper and/or excavator loader may be used.
  vi. For final clearing of the fire line area(s), plows and/or bulldozers may be used.

In addition, other suitable equipment may be used that best fits a particular situation (e.g., as determined by the tree harvesting team).

Figure 3:
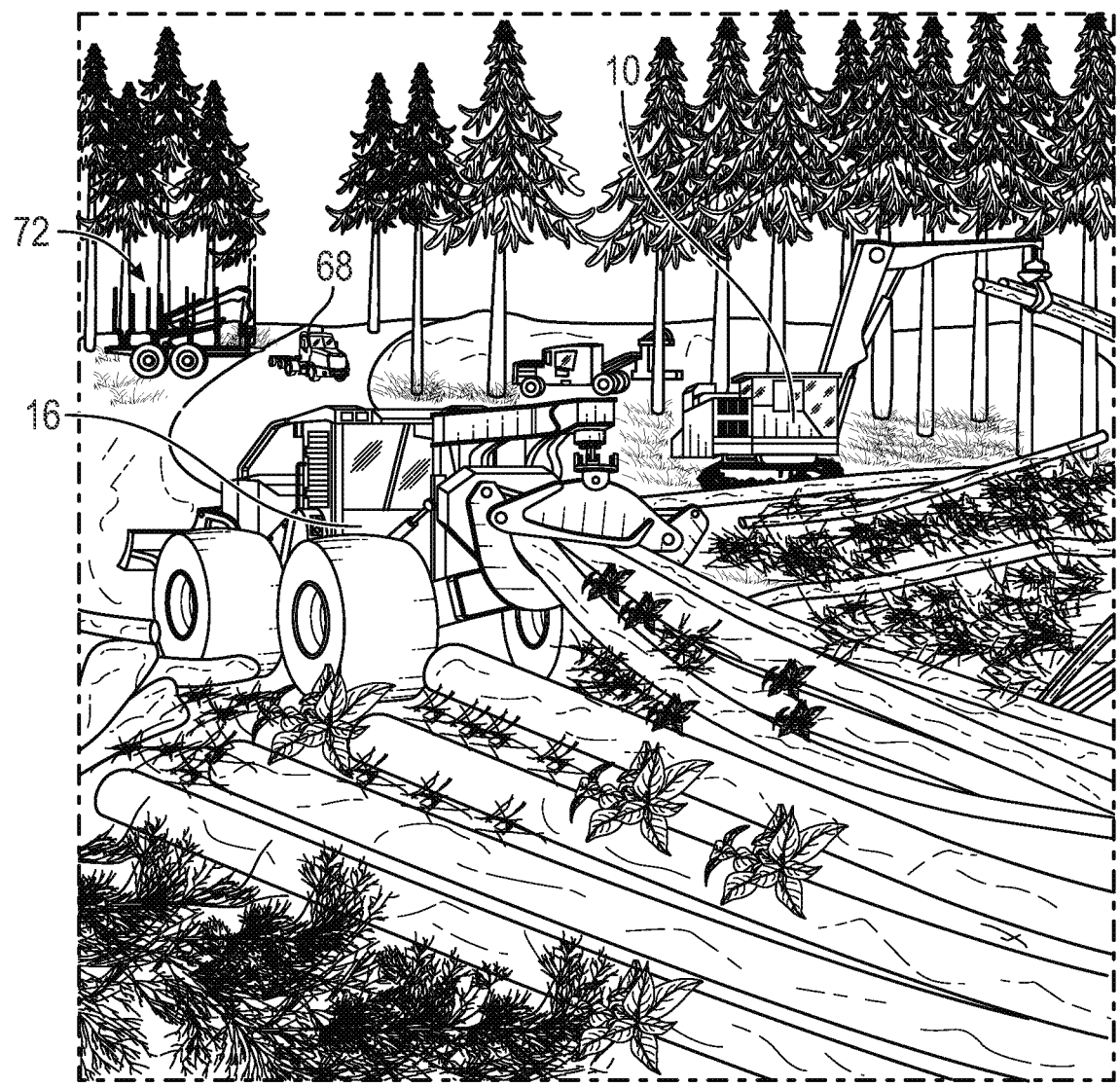
FIG. 3 is a perspective view depicting several items of forestry equipment working together in a fire line.
Figure 5:
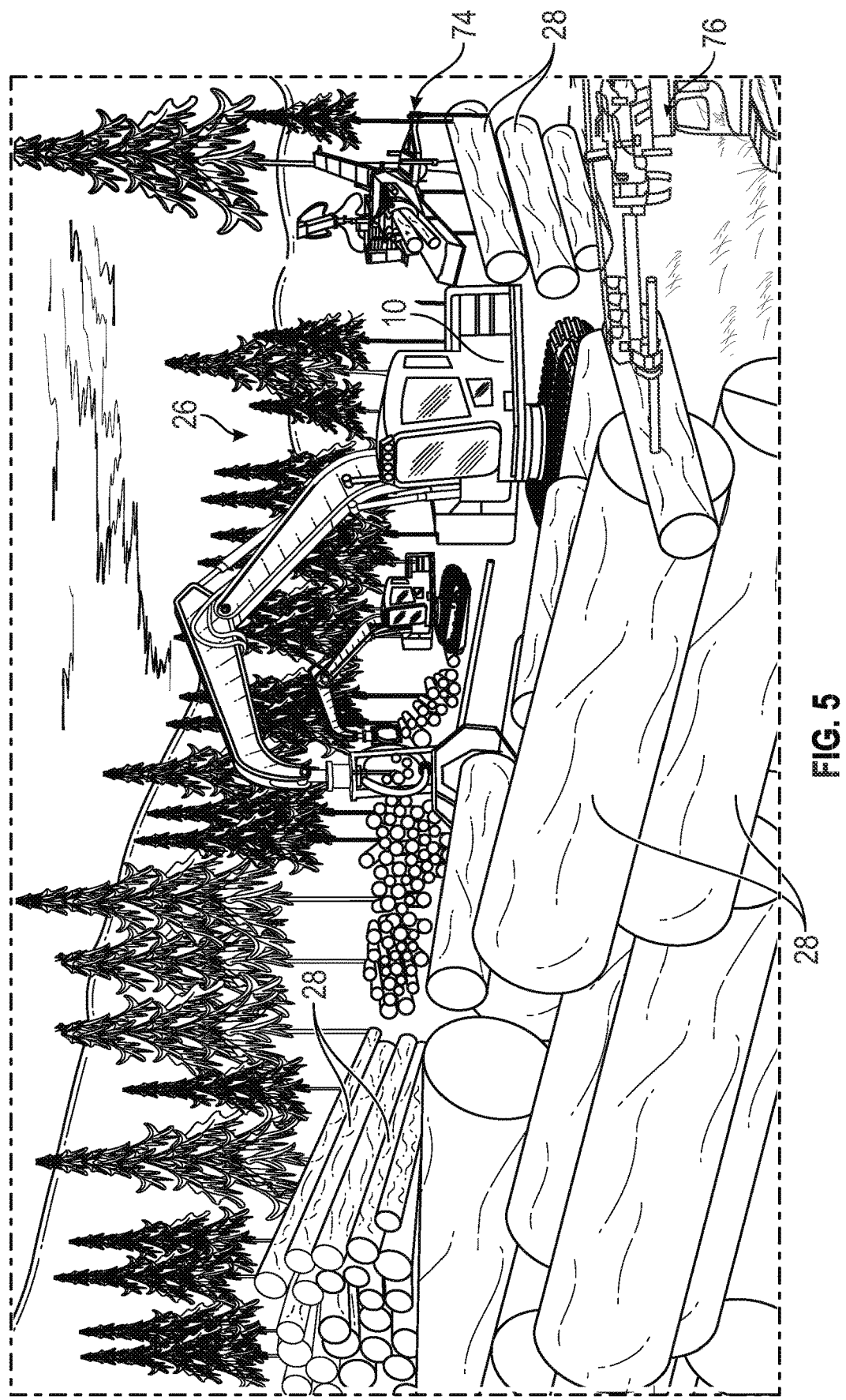
FIG. 5 is a perspective view depicting several items of forestry equipment working together in a work area.
Figure 11:
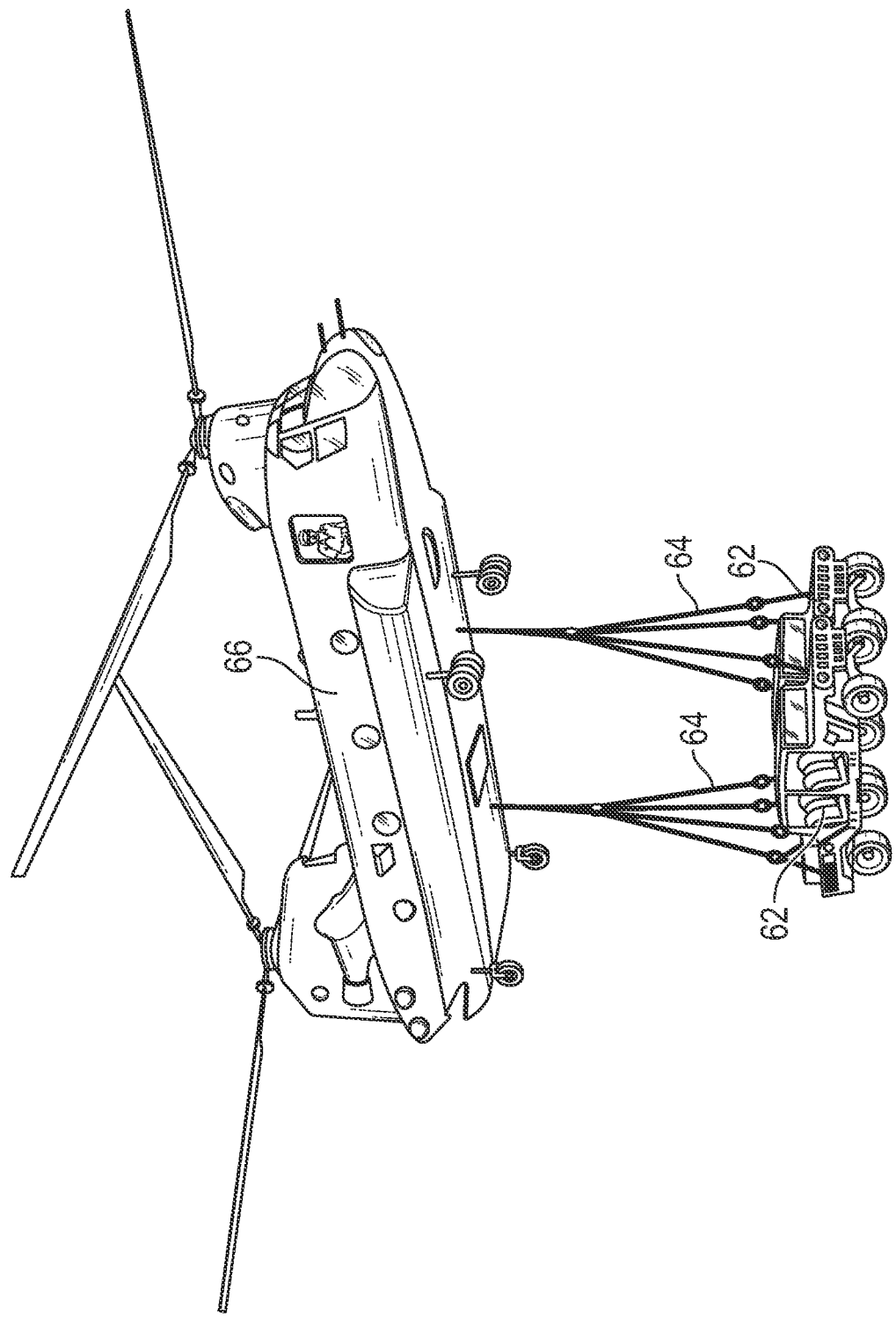
FIG. 11 is a perspective view depicting a transport helicopter transporting a plurality of high mobility multipurpose wheeled vehicles.
Figure 12:
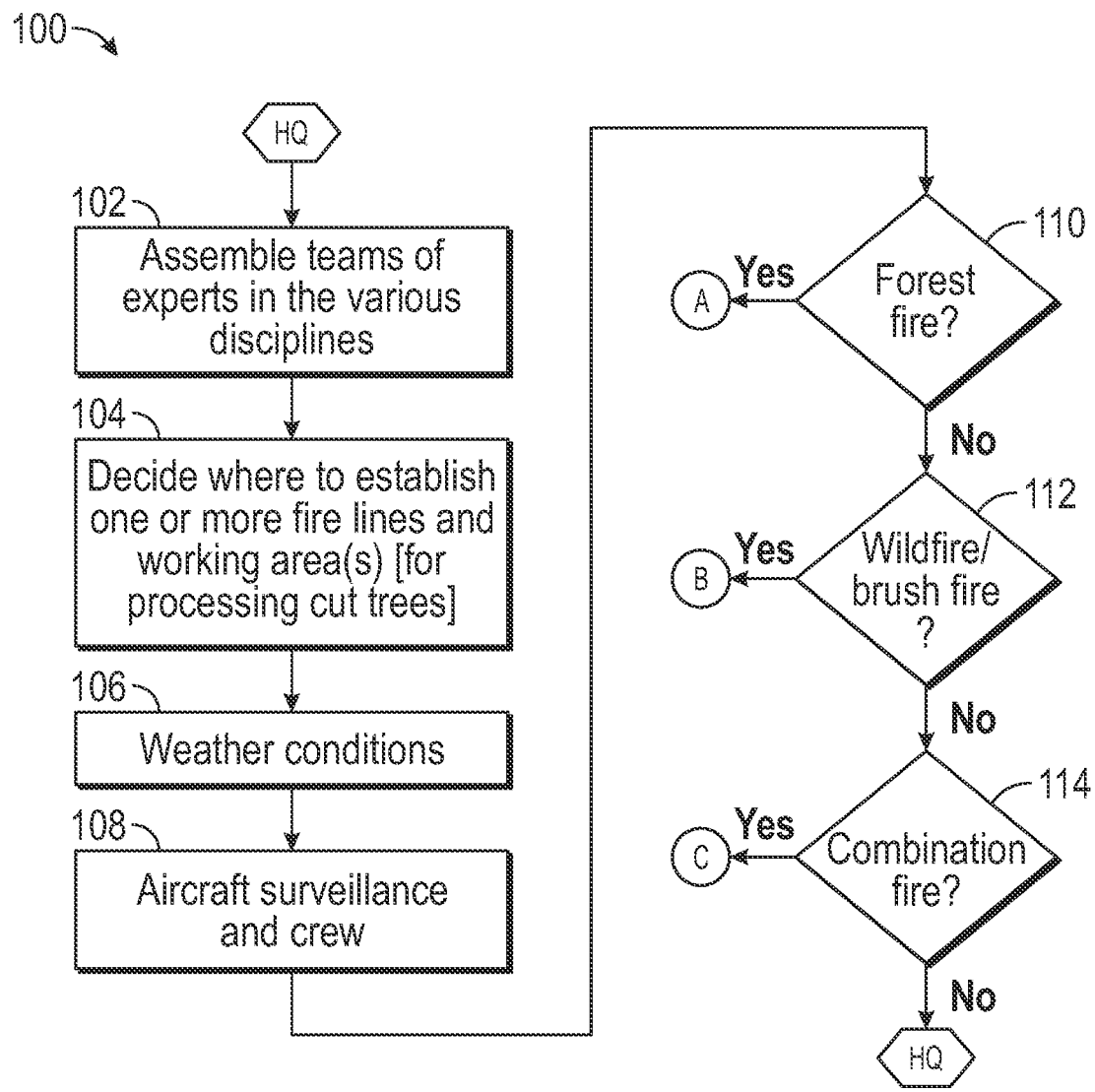
FIG. 12 is a partial flowchart depicting initial steps of a method for fighting forest fires and/or wildfires, according to an illustrative embodiment of the invention.

In the illustrative embodiment, once the types of equipment needed are determined, Step 3 listed above involves the process of identifying viable works areas so equipment can be delivered to these areas. An example of what a work area 26 looks like is shown in FIG. 5. In this exemplary figure, a feller buncher 10 is depicted in a work area 26 containing cut tree sections 28. In addition, a wood chipper 74 and a stroke delimber 76 are further illustrated in the work area 26 of FIG. 5. In the illustrative embodiment, equipment is airlifted into the areas where needed. It may be necessary to create clearings for equipment before the equipment can be airlifted onsite. Some transport equipment, like a cargo handling helicopter (e.g., a Chinook® helicopter) can transport equipment and operators for the equipment at the same time. For example, as shown in FIG. 11, a cargo handling helicopter 66 is shown transporting a plurality of high mobility multipurpose wheeled vehicles 62, which are attached to the underside of the helicopter 66 by chains 64 (i.e., a sling-loaded transport of the vehicles 62). In another embodiment, rather attaching the chains 64 to the vehicles 62, the vehicles 62 could be placed on a platform suspended from the underside of the helicopter by chains. In the illustrative embodiment, one of the key reasons, besides efficiency, for establishing separate work areas-separate from the location of the fire line(s)—is safety. It is important that the fire lines are cleared of any material that could be a trip-hazard for operators and firefighters. This also facilitates clearing the fire lines more quickly. If there are any exceptionally large or old trees in the fire line area leave them if possible, after clearing all ground cover from around those trees. FIG. 3 shows an example of several machines working together, which include a feller buncher 10 to cut the trees and a grapple skidder 16 to move the cut trees. Both of these machines 10, 16 will be working in the fire line area. In addition, a flatbed truck 68 and a forward loader 72 are further illustrated in FIG. 3.

Figure 2:
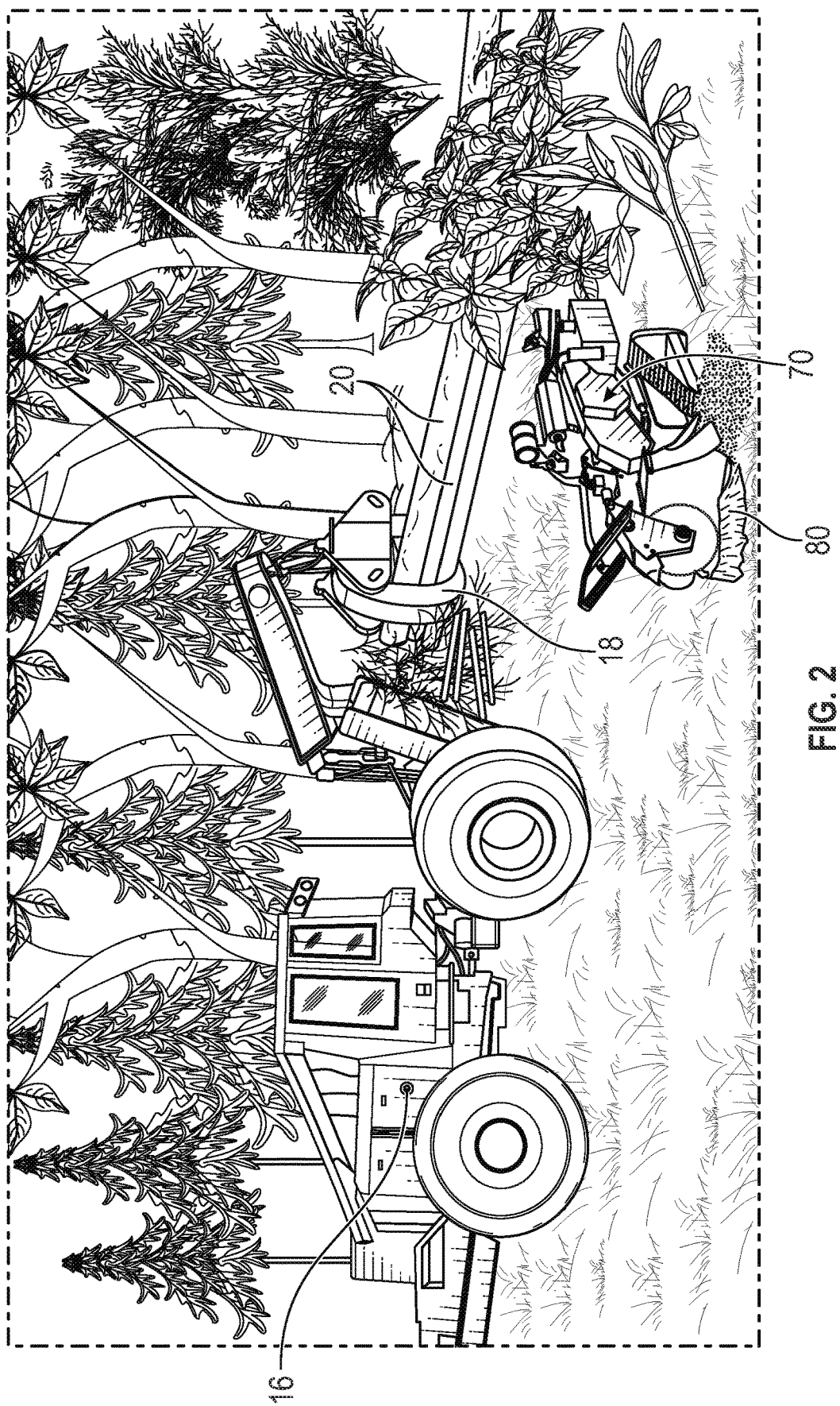
FIG. 2 is a perspective view depicting a grapple skidder for grabbing and moving a bunch of cut trees.
Figure 4:
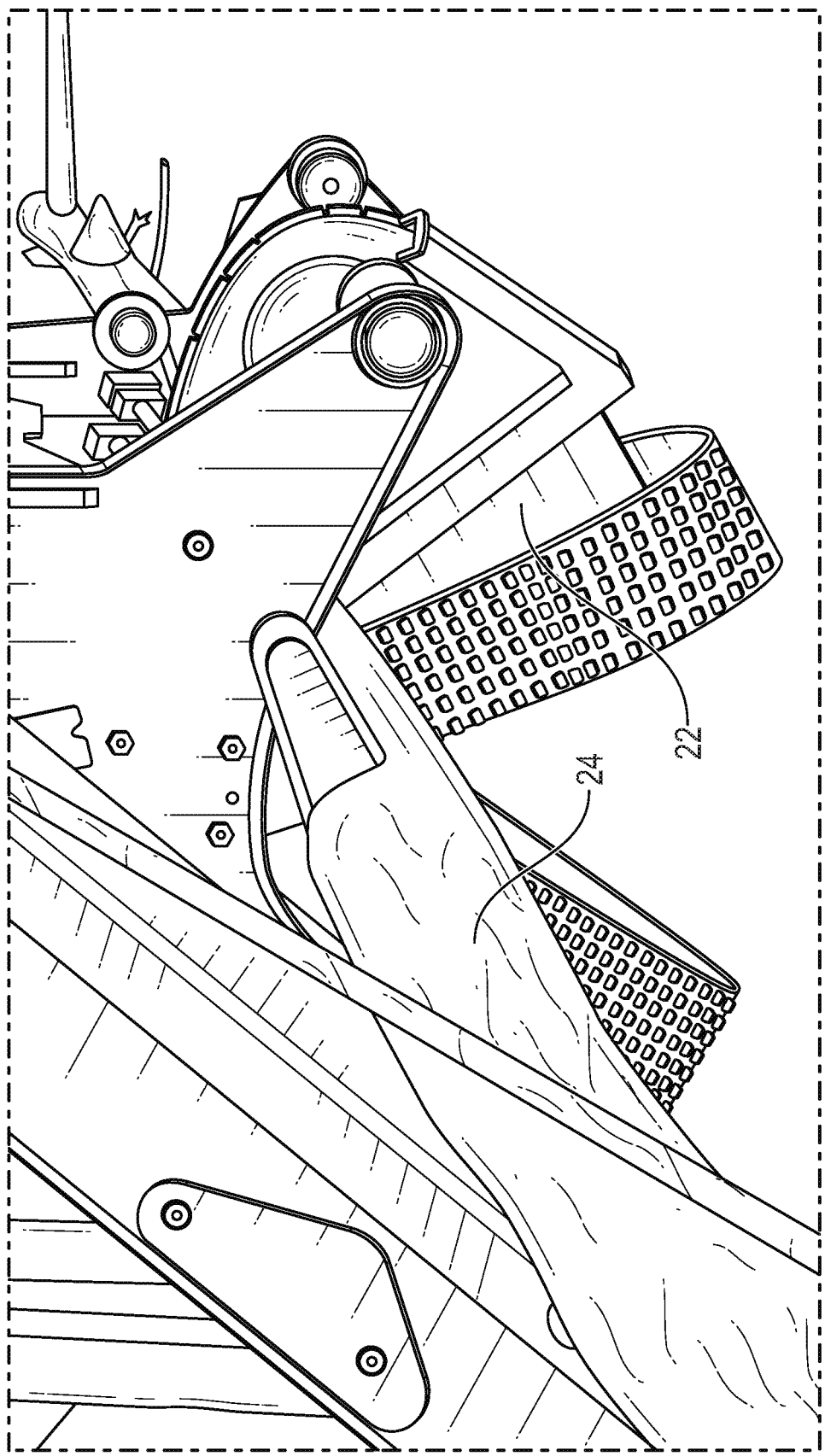
FIG. 4 is a perspective view depicting a combination cutter and delimber head used for cutting and delimbing trees.

In the illustrative embodiment, step 4 above involves the process of cutting the trees down. In the example depicted in FIG. 1, there is shown a feller buncher 10 with a head 12 that cuts a tree down and grabs it for stacking with other felled trees 14. If the trees are smaller in diameter this piece of equipment can cut and grab several trees before stacking them for removal. Once the trees are cut down, the felled trees are to be quickly dragged (FIG. 2 shows an example of a grapple skidder 16 with a grappling device 18 that grabs and moves a bunch of felled trees 20) to the work area for stripping (delimbing) and cutting (FIG. 4 depicts an exemplary head 22 (e.g., a Waratah® head) designed to do both the stripping and cutting of a tree 24), which is the functionality described in step 5 above. Then, the remaining tree components are processed by performing functions described in steps 6 and 7 above. Preparing the trees for off-site handling can get messy (delimbing and cutting trees leaves pieces of the trees all over the area) so all these activities are preferably done away/out of the fire line area. Step 6 above describes gathering/preparing any other usable wood components for later transport to a lumber mill or other processing facility. Per step 7 above, the tree parts like branches, trectops, etc. that cannot be used for wood products are to be chipped and/or just transported off-site.

Figure 6:
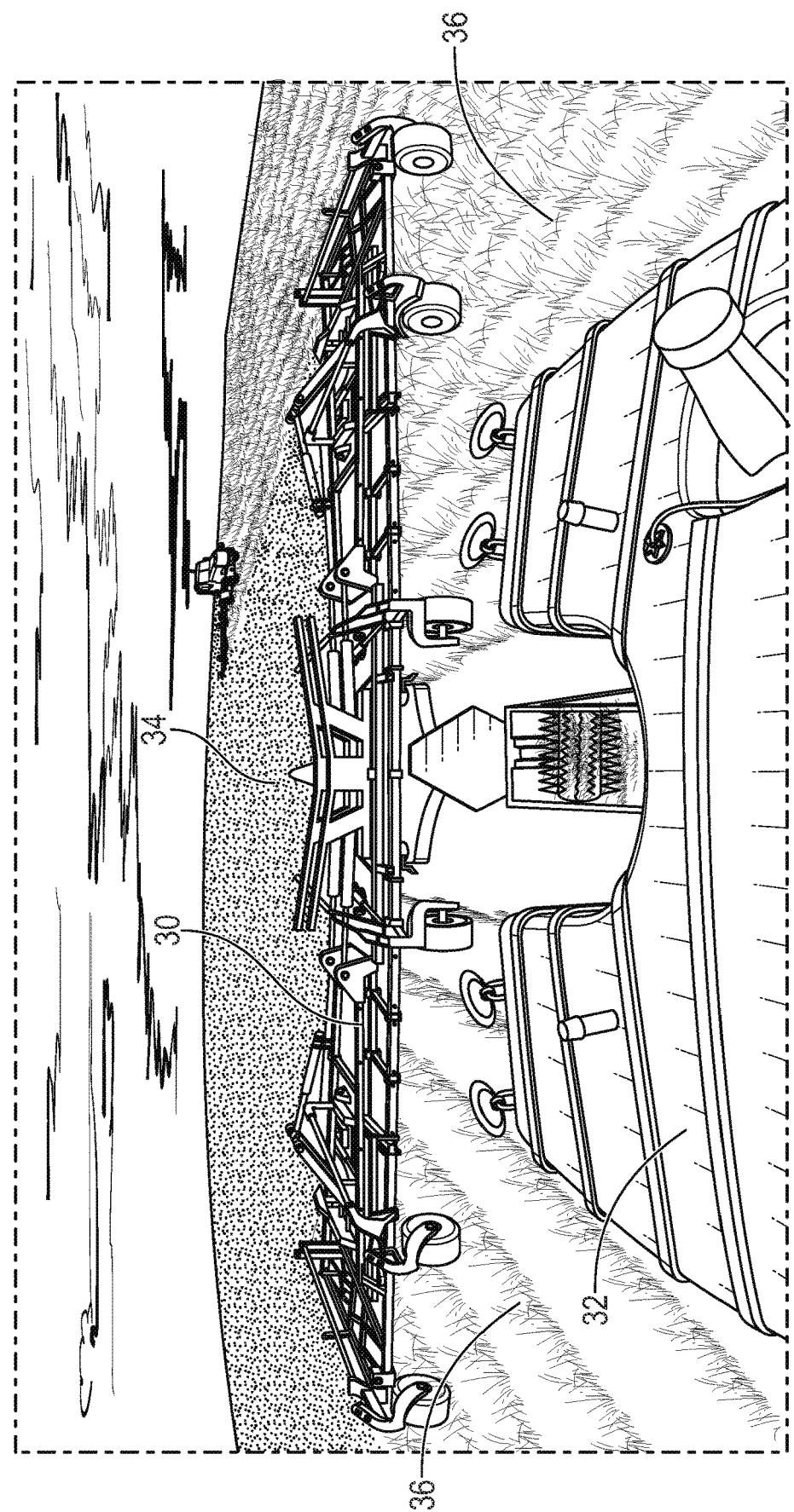
FIG. 6 is a perspective view depicting a set of plows in operation as a cluster to clear a broader section of land along a fire line.

In a situation where harvesting and removal of trees is sufficient to establish the fire line, meaning tree stumps are so close to the ground that they pose no real fire threat and there is minimal ground cover, steps 8 and 9 described above are not needed. Again, in the illustrative embodiment, the experts onsite may determine the best course of action. Step 8 above involves handling of the tree stumps, along with the root system since fire can extend to the roots below ground, which are to be dug up and moved to the work area to be disposed of or chipped as appropriate. For example, as shown in FIG. 2, a tree stump grinder 70 may be used to grind up tree stumps 80 in the fire line. Besides the tree stumps, sizable rocks also may need to be cleared before the plows are brought in. Rocks can damage equipment which would delay completing the fire line while equipment is repaired or replaced. There is equipment that will remove rocks if it is determined that rock removal needs to be automated. Now that all the trees are removed from the fire line area, in step 9 of the illustrative method described above, plows are brought in to plow under the remaining vegetation (pine needles, leaves, and other ground cover) so the fire line is fully established. FIG. 6 shows an example of a set of plows 30 in operation as a cluster to clear a broader section of land. In the example depicted in FIG. 6, each plow 30 is pulled behind a vehicle 32 over unplowed land 36 to produce smooth plowed land 34 in the fire line. Once the fire line is completed, the team can move to another area to continue this same process.

B. Fighting Wildfires

In one or more embodiments, the illustrative steps described below are used to fight a wildfire. Where specific types of farming equipment are referenced below, these devices may need to be modified for use in clearing fire line areas as the equipment was not necessarily designed for the vegetation found in these applications. Even if not expressly stated, the steps below apply to situations where there is one or there are multiple fire lines being established.

1. Assess the area for the best place(s) to establish a fire line or multiple locations for fire lines as needed.
2. Determine the types of ground cover-clearing equipment needed with the assistance of farming and other appropriate equipment experts.
3. Set up a staging area away from the fire line where bales of bundled cut ground cover can be stacked for removal. All staging areas are to be established in safe zones away from the fire zone. Arrange to have the appropriate equipment airlifted onsite to the various areas and this equipment needs to have been modified with lifting hooks welded thereon to facilitate airlifting the equipment and operators onsite. If airlifting is not possible, that equipment will need to be transported to the fire zone by truck.
4. Use rotary cutters/rotary mowers to cut down the ground cover in the fire line area(s). Some modification of this equipment may be needed.
5. Follow the rotary cutters/rotary mowers with hay rakes to funnel the cut ground cover into rows. Some modification of this equipment may be needed.
6. Bring in the balers to make bales out of the rowed, cut ground cover. Some modification of this equipment may be needed.
7. Move the bales to the staging area where they can be loaded and removed.
8. Then, plows are brought in to plow under any remaining ground cover leaving only dirt so there is nothing left to burn or restart the fire. This completes the process of establishing a fire line.

Figure 10:
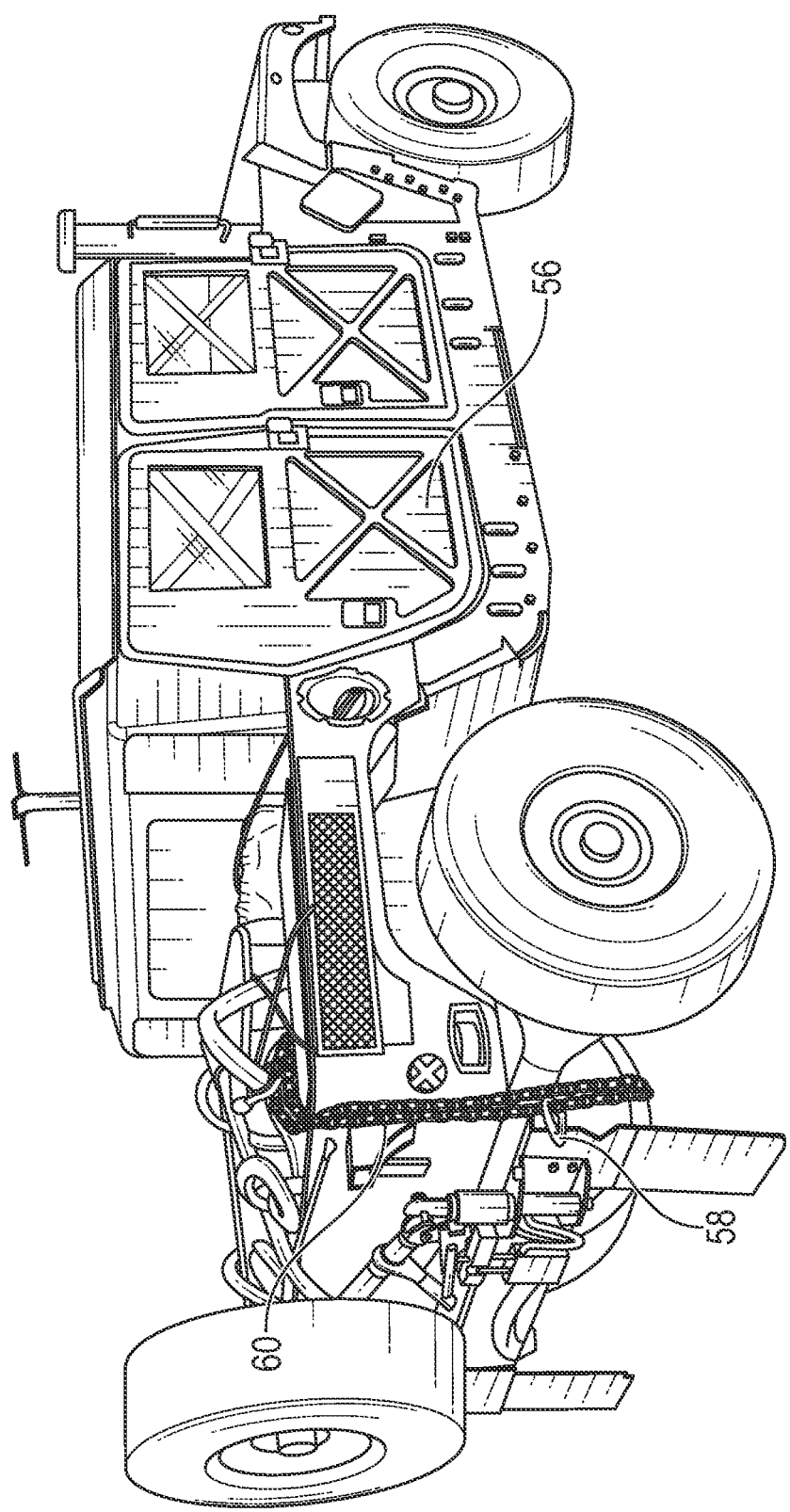
FIG. 10 is a perspective view depicting a high mobility multipurpose wheeled vehicle that is fitted with attachment rings and chains for being airlifted to a location of a fire.

In the illustrative embodiment, expanding on the steps listed above, once a fire line location is determined, or multiple locations as necessary, and a staging area is identified, the process of bringing equipment to the site can begin. In large-scale fire situations, firefighters are typically air-lifted to a site and dropped into a safe area near the fire. This limits the equipment each firefighter can bring with them. Equipment needed to fight fires or support this process can be air-lifted to the location. The faster this equipment can be brought into play, the better. High mobility multi-purpose wheeled vehicles (Humvees) can be employed to facilitate movement of equipment and fire fighters to accelerate the process of establishing a fire line or lines. For example, as shown in FIG. 10, a high mobility multipurpose wheeled vehicle 56 (Humvee 56) may be provided with lifting rings 58 welded thereon for receiving chains 60 that can be attached to a transport aircraft (e.g., a cargo handling helicopter 66—see FIG. 11). The ultimate goal is to create a sufficiently wide fire line to stop the spread of a wildfire. Additional equipment, beyond what has traditionally been employed, is needed to reach this goal. Helicopters (e.g., heavy-lift helicopters, such as the Sikorsky Skycrane®) can transport the types of equipment like tractors, vegetation clearers such as rotary cutters/mowers, hay rakes, balers, and plows, essentially all the equipment needed for clearing the ground of burnable materials and establishing the control line(s). Preferably, this equipment already needs to have been prepared to be airlifted by having lifting hooks or rings welded on. Otherwise, equipment may need to be transported onsite by truck. Additional equipment that may be used is described hereinafter.

Figure 7:
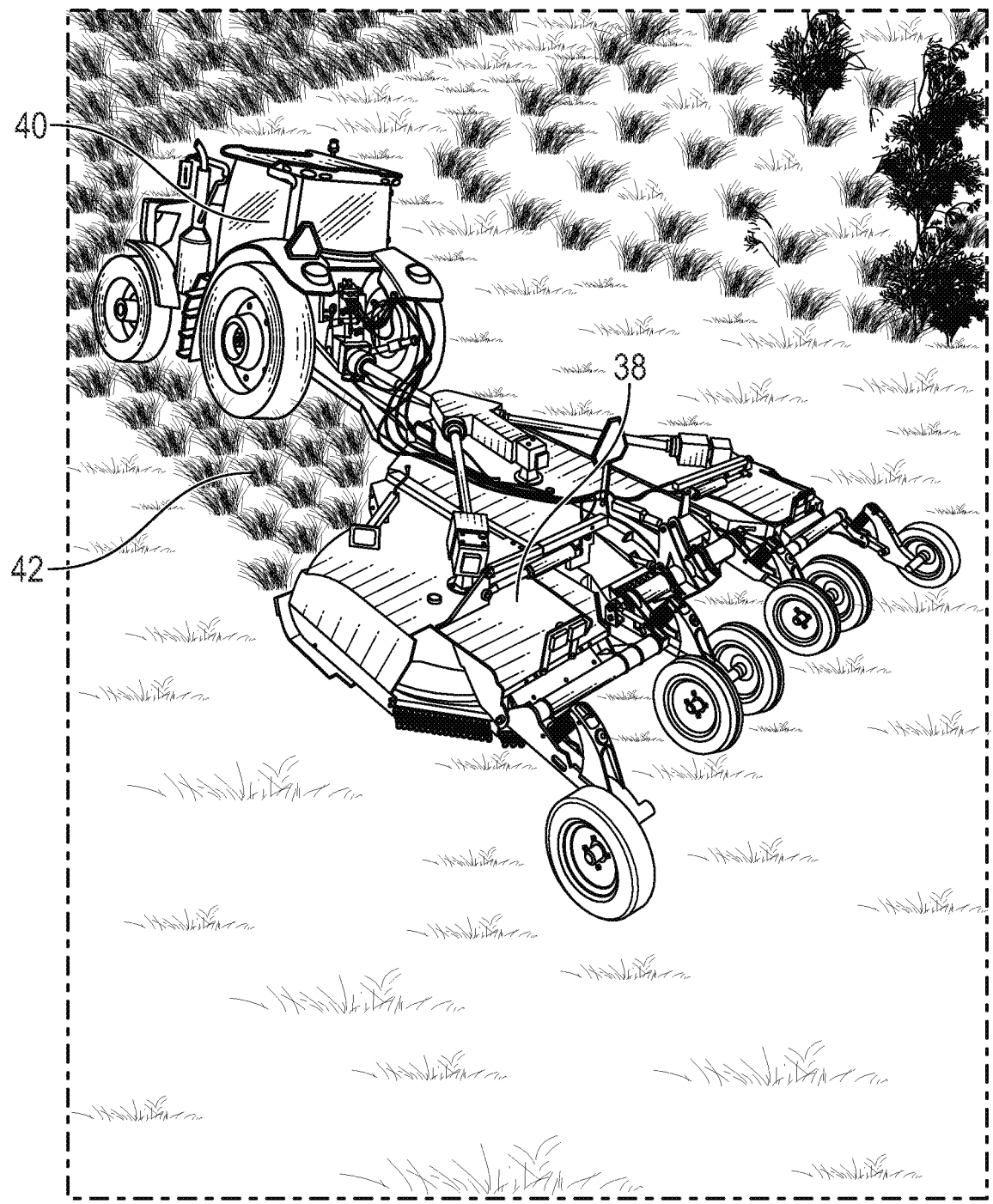
FIG. 7 is a perspective view depicting a tractor and attached rotary cutter/mower for clearing ground cover along a fire line.

In the illustrative embodiment, for creating a fire line to prevent the spread of wildfires, one may begin with a tractor and attached rotary cutter/rotary mower 38 (see FIG. 7) for clearing ground cover (brush, dense weeds, high grasses, etc.). In the example depicted in FIG. 7, the rotary cutter/rotary mower 38 is being pulled by a tractor 40 to clear the ground cover 42 along the fire line. Rotary cutters/rotary mowers (e.g., a Bush Hog®) can cut down this type of ground cover quickly and more efficiently so it can be raked up for removal. Acres of ground can be covered in a matter of hours using several rotary cutters/rotary mowers working in tandem or an array or cluster-like a "V" formation. As an example, using 10 rotary mowers each with a 20-foot spread, a 200-foot-wide stretch of ground cover can be easily and quickly cleared.

Figure 8:
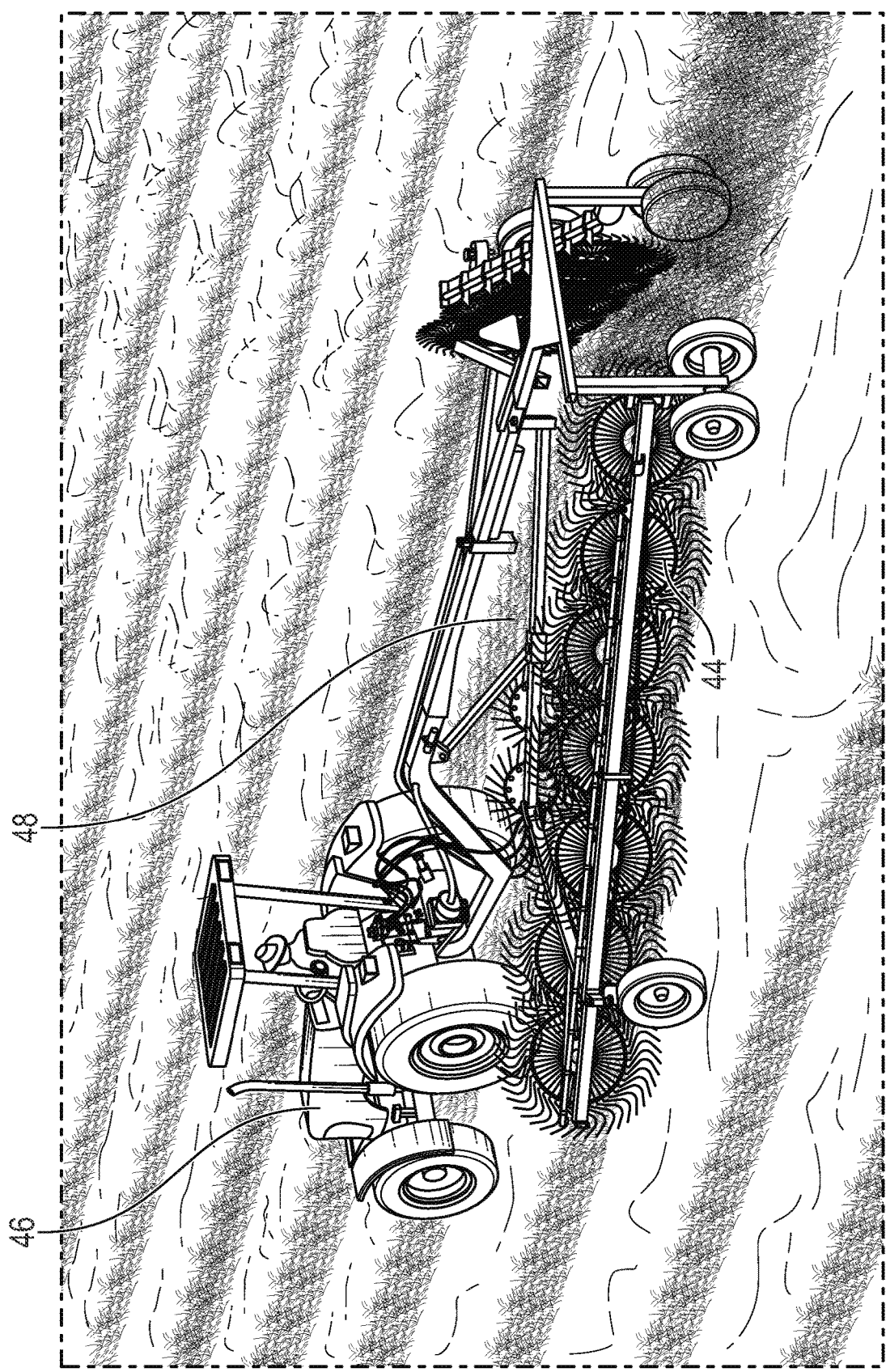
FIG. 8 is a perspective view depicting a tractor and attached hay rake for funneling a large area of cut ground cover into rows for baling.

Next, in the illustrative embodiment, hay rakes 44 (see an example in FIG. 8) pulled by tractors 46 come behind the rotary cutters to funnel a large area of cut ground cover 48 into rows for the balers. Preferably, using an array of hay rakes, this work can be accomplished in a much faster time period than performed by conventional hay rakes. Conventional hay rake devices may need to be modified to handle this type of cut ground cover.

Figure 9:
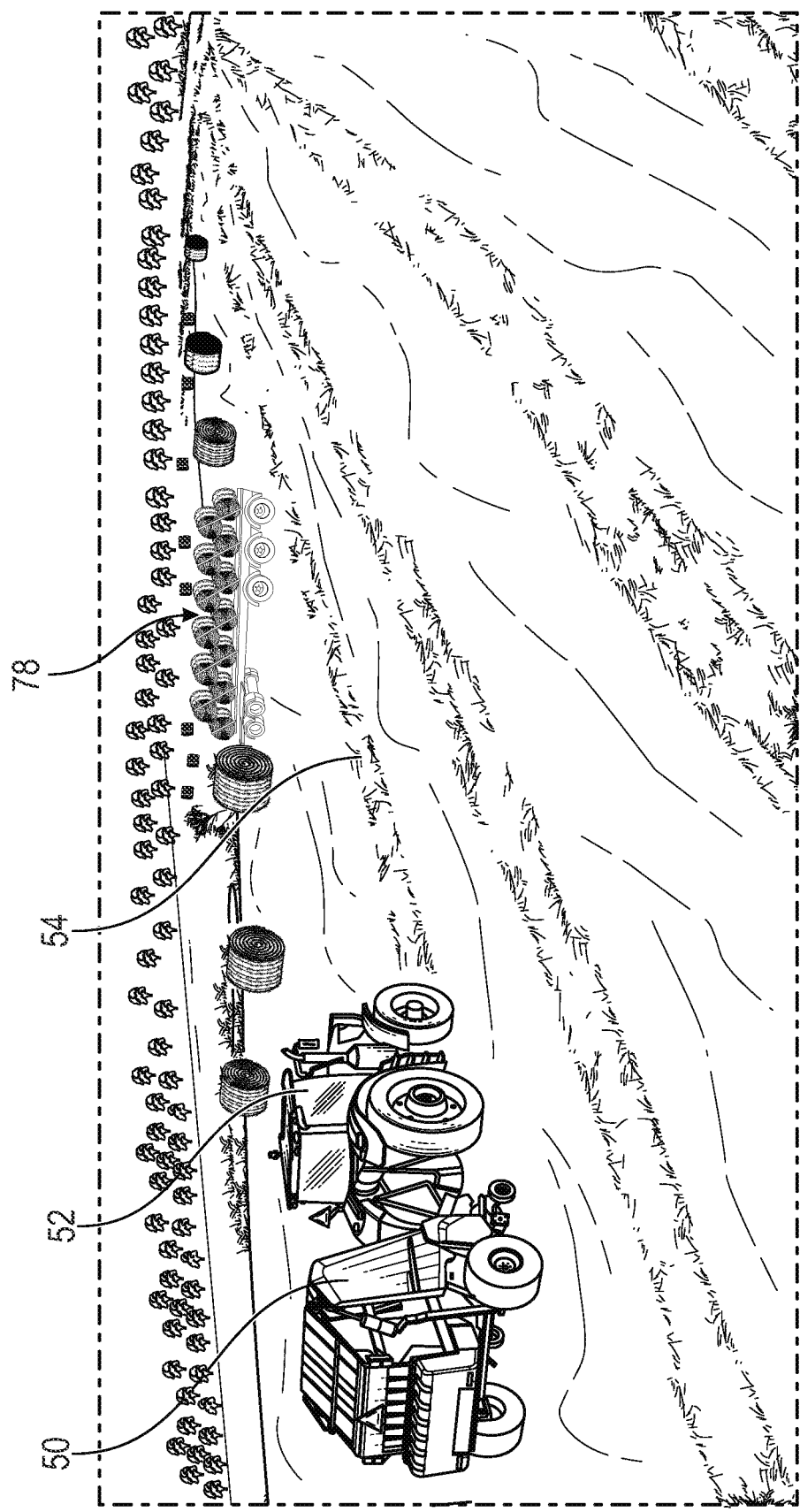
FIG. 9 is a perspective view depicting several items of baler equipment working together in a fire line.

In the illustrative embodiment, following behind the hay rakes are the balers, which may also be pulled by tractors. After the cut ground cover has been funneled into rows, the balers can grab the cut vegetation and build round-shaped bales that can more easily be collected and removed from the fire line. FIG. 9 is an example of a baler 50 pulled by a tractor 52 in operation where hay rakes already funneled ground cover into rows 54 and with several round-shaped bales already having been constructed, waiting to be moved from the area. Here also, the traditional baler equipment may need to be modified.

Now that the cut ground cover has been bundled into bales, in the illustrative embodiment, equipment will be used to collect the bales and load them onto a hay wagon 78 (see FIG. 9), a flat-bed truck 68 (see FIG. 3), or other type of transport vehicle for removal from the fire line.

In the illustrative embodiment, once all the ground cover is removed, the last objective is removal of any sizeable rocks that could prevent effective use of the plows. Once the rocks are removed or if that is not an issue, the final step is to get to the bare earth. Using plows or more specifically chisel plows 30 (see FIG. 6), the ground can be turned over so nothing is left that can be burned. This is the final step in creating a very extensive fire line much faster and more efficiently than humanly possible.

C. Fighting Fires in Areas with a Combination of Forest and Non-Forest Terrain In one or more further embodiments, the methods described above can be combined for fires that are a combination of forest fires and wildfires, i.e., fires in non-forest areas. In this type of scenario, the techniques and equipment as described in the prior two sections can be used for the combination fire, each to address the appropriate type of fire situation. Oversight and management of the teams handling this type of fire situation is even more critical since more equipment and operators are needed as well as coordination to get the right equipment to the right areas for construction of the needed fire lines.

D. Exemplary Methods Illustrated in Flowcharts

Now, with reference to the flowcharts illustrated in FIGS. 12-15, illustrative methods for fighting forest fires and/or wildfires will be described. Initially, with reference to the flowchart 100 in FIG. 12, the illustrative method begins in step 102 with assembling a team of experts in the various disciplines. Then, in step 104, it is decided where the one or more fire lines and one or more working areas should be established at the location of the fire. Next, in step 106, the weather conditions are assessed, and aircraft surveillance and crew is sent to the location of the fire in step 108. After which, in decision block 110 of FIG. 12, it is determined whether or not the fire constitutes a forest fire (e.g., only a forest fire). If it is determined in decision block 110 that the fire constitutes a forest fire, then the method proceeds to step 118 in FIG. 13. Otherwise, if it is determined in decision block 110 that the fire does not constitute a forest fire, then the method proceeds to decision block 112 in FIG. 12 where it is determined whether or not the fire constitutes a wildfire or brush fire (e.g., only a wildfire or brush fire). If it is determined in decision block 112 that the fire constitutes a wildfire or brush fire, then the method proceeds to step 138 in FIG. 14. Otherwise, if it is determined in decision block 112 that the fire does not constitute a wildfire or brush fire, then the method proceeds to decision block 114 in FIG. 12 where it is determined whether or not the fire constitutes a combination fire. If it is determined in decision block 114 that the fire constitutes a combination fire, then the method proceeds to step 156 in FIG. 15. Otherwise, if it is determined in decision block 114 that the fire does not constitute a combination fire, then the method ends.

Figure 13:
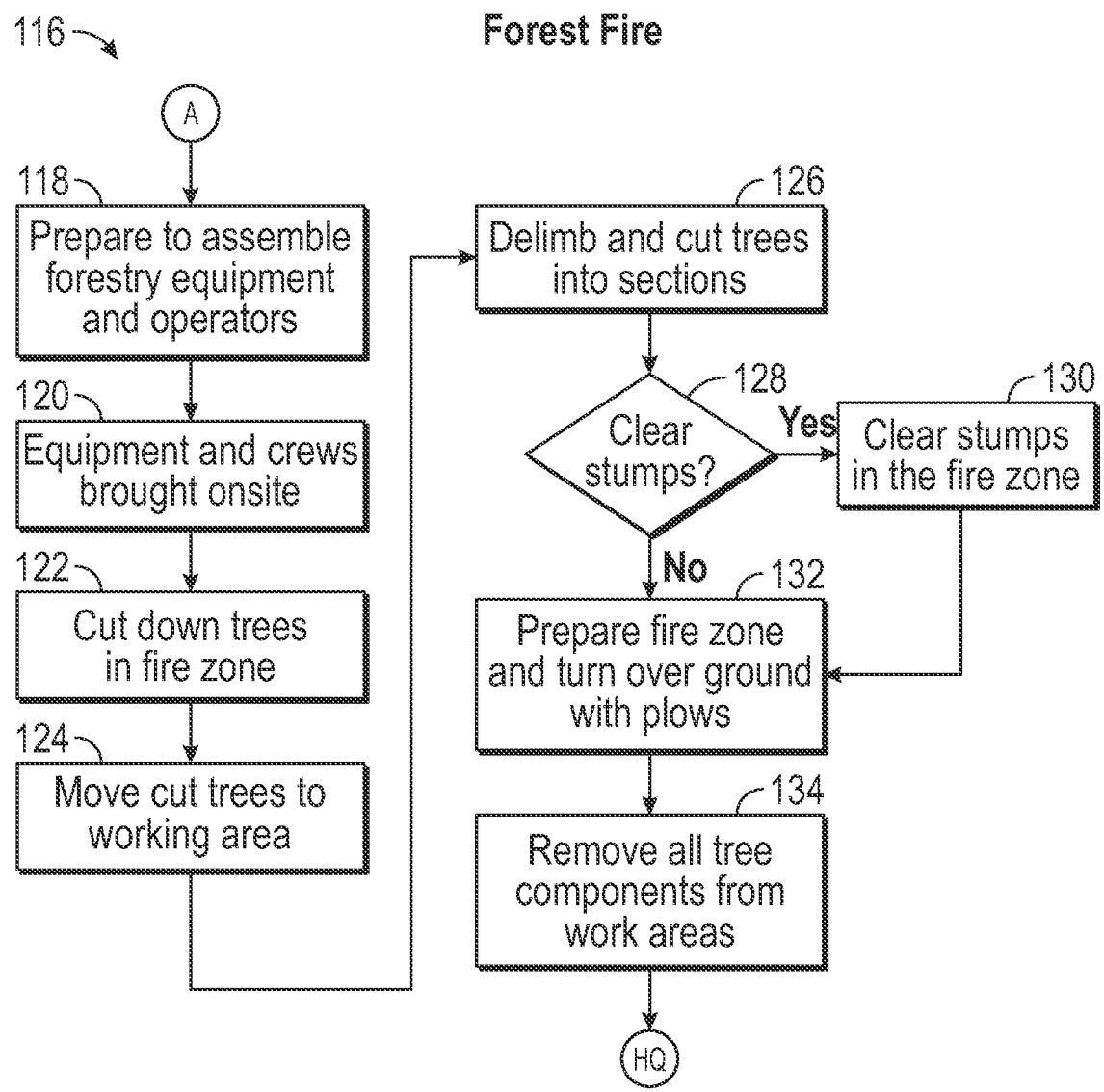
FIG. 13 is a continuation of the flowchart of FIG. 12, which illustrates additional steps of the method for fighting a forest fire, according to the illustrative embodiment of FIG. 12.

Next, turning to the flowchart 116 of FIG. 13 for a forest fire, initially in step 118, forestry equipment and operators are assembled together. Then, in step 120, equipment and crews are brought onsite at the location of the fire. Next, in step 122, trees are cut down in the one or more fire zones or fire lines, and cut trees are moved to the one or more work areas in step 124. Following step 124, the cut trees in the one or more work areas are delimbed and cut into sections in step 126. After which, in decision block 128 of FIG. 13, it is determined whether or not to clear stumps from the one or more fire zones or fire lines. If it is determined in decision block 128 that the stumps are to be cleared, then the method proceeds to step 130 in FIG. 13 where the stumps in the one or more fire zones are cleared, followed by step 132. Otherwise, if it is determined in decision block 128 that the stumps are not to be cleared, then the method proceeds directly to step 132 where the one or more fire zones are prepared and the ground in the one or more fire zones is turned over with plows. Finally, in step 134 of FIG. 13, all tree components are removed from the one or more work areas. After step 134, the method for fighting a forest fire ends.

Figure 14:
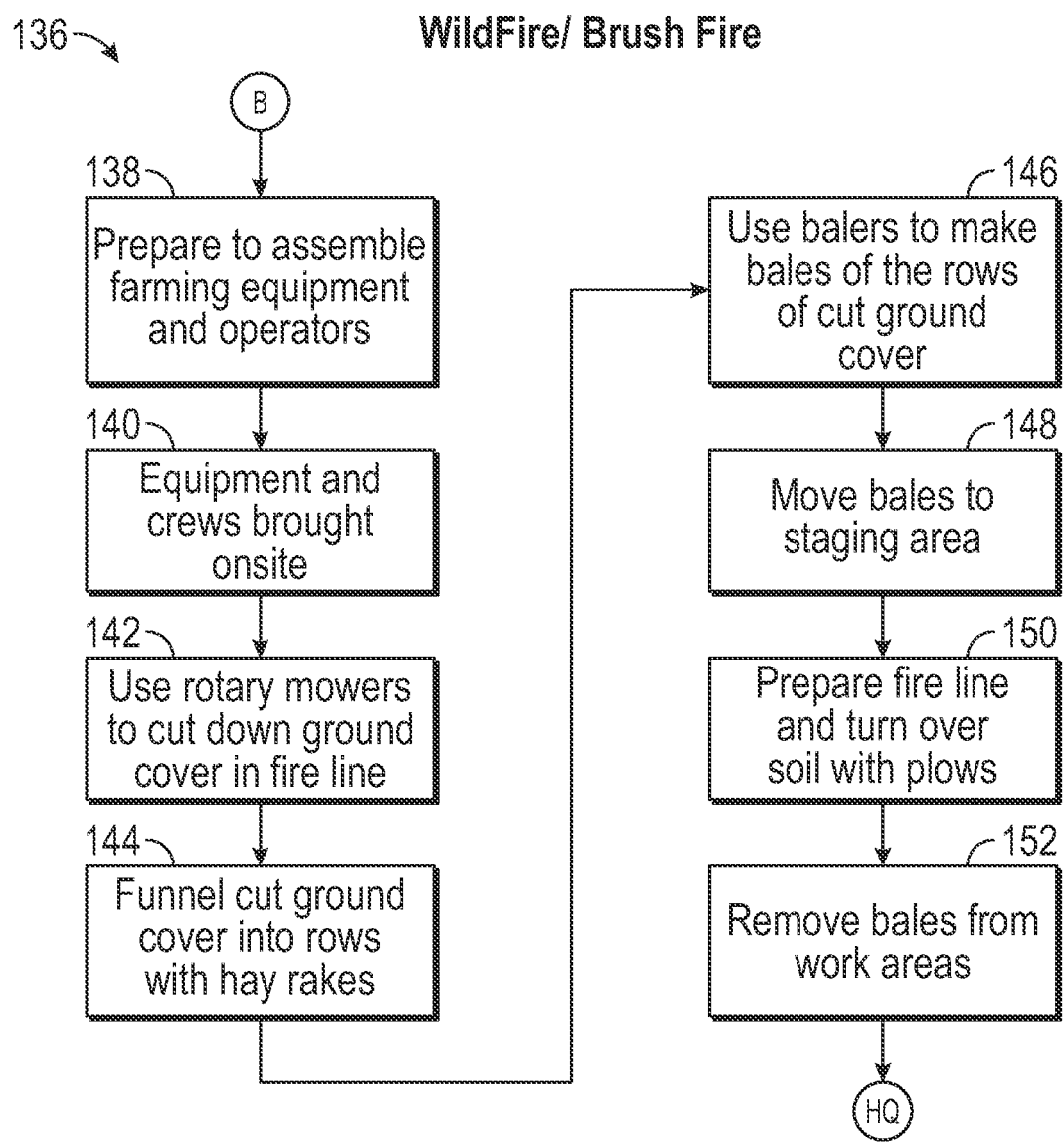
FIG. 14 is a continuation of the flowchart of FIG. 12, which illustrates additional steps of the method for fighting a wildfire, according to the illustrative embodiment of FIG. 12.

Now, referring to the flowchart 136 of FIG. 14 for a wildfire or brush fire, initially in step 138, farming equipment and operators are assembled together. Then, in step 140, equipment and crews are brought onsite at the location of the fire. Next, in step 142, ground cover is cut down in the one or more fire zones or fire lines using rotary mowers/cutters, and the cut ground cover is funneled into rows with hay rakes in step 144. Following step 144, the cut ground cover in the rows is formed into bales using balers in step 146. After which, in step 148, the bales of cut ground cover are moved to the one or more work areas or staging areas. Next, in step 150 of FIG. 14, the one or more fire lines are prepared and the ground in the one or more fire lines is turned over with plows. Finally, in step 152 of FIG. 14, the bales are removed from the one or more work areas or the one or more staging areas. After step 152, the method for fighting a wildfire or brush fire ends.

Figure 15:
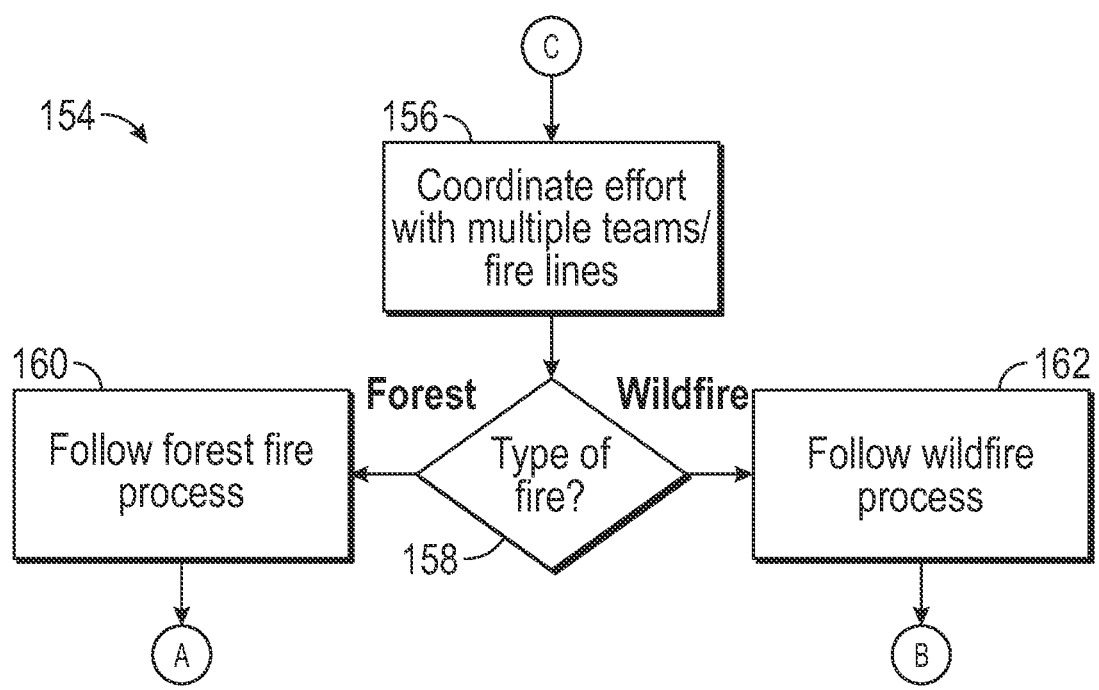
FIG. 15 is a continuation of the flowchart of FIG. 12, which illustrates additional steps of the method for fighting a combination forest fire and wildfire, according to the illustrative embodiment of FIG. 12.

Next, turning to the flowchart 154 of FIG. 15 for a combination forest fire and wildfire, initially in step 156, firefighting efforts are coordinated with multiple teams and fire lines. Then, in decision block 158 of FIG. 15, the type of fire is determined. For the forest fire, the combination method proceeds to step 160 where the forest fire process steps described in flowchart 116 of FIG. 13 are followed. For the wildfire, the combination method proceeds to step 162 where the wildfire process steps described in flowchart 136 of FIG. 14 are followed.

E. Inaccessible Local Terrain

In yet one or more further embodiments, a strategy for handling a fire situation in inaccessible locals is needed, where the locals are inaccessible because the terrain is very steep. Addressing these areas is pertinent in the situation where the locals are in imminent danger of being engulfed by fire. Any firefighting efforts in these areas are too time consuming and require special handling of any equipment, such as previously described, to be used. For this type of fire, an aerial attack with distribution of flame retardant or water/chemical sprayed on the vegetation on these steep hills is a quicker and easier method to handle this terrain. Also, for this type of fire, it is best for people to work in areas that are more accessible and safer. Certainly, equipment, as discussed earlier, and most fire-fighting manpower are unsuitable for any significant deterrent to fight a fire or establish a fire line on these steep hills. Therefore, using water, flame retardant and other techniques are among the preferred ways to handle this scenario. Ultimately the on-sight experts will make the determination of how best to address any situation of this nature.

It is readily apparent that the aforedescribed methods for fighting forest fires and/or wildfires offer numerous advantages and benefits. For example, the benefits of the methods for fighting forest fires and/or wildfires include:

i. By harvesting trees, the wood can be used, even sold, instead of being destroyed thus aiding in conservation and post-fire recovery efforts—for infrastructure, restoring forest lands and rehabilitation of habitats.

ii. For forest fires, the aforedescribed methods use less chemicals and water and prepare the ground for replanting indigenous trees once the fire is out.

iii. The aforedescribed methods get fires under control much more quickly so valuable land, property and wildlife are spared.

iv. Getting fires under control more quickly improves the air quality in the immediate areas of the fire and in surrounding areas (per a Weather Channel article that states wildfire smoke makes up half of the small particle air pollution in the Western U.S.).

v. Improvements in air quality by getting fires under control quicker reduce the threats from global warming and climate control issues.
vi. Fires as they burn emit carbon dioxide and other greenhouse gases that compromise air quality and contribute to the climate crises (per the same WWF article cited earlier). Getting fires under control more quickly will improve these conditions. Also, as more trees are available, their removal of $CO_2$ from the air can be accelerated.
vii. Getting fires under control quicker will have a major benefit to insurance companies because of a reduction in the loss of property in areas adjacent to fires.
viii. Reducing the duration of fires will save millions of dollars that have been spent fighting long-duration fires as well as the post-disaster recovery for infrastructure, restoring water quality, and rehabilitation of wildlife and habitats.
ix. By harvesting trees to facilitate the containment of fires, those trees when utilized for logging will reduce the number of other trees that must be cut for logging purposes.

Any of the features or attributes of the above described embodiments and variations can be used in combination with any of the other features and attributes of the above described embodiments and variations as desired.

Although the invention has been shown and described with respect to a certain embodiment or embodiments, it is apparent that this invention can be embodied in many different forms and that many other modifications and variations are possible without departing from the spirit and scope of this invention.

Moreover, while exemplary embodiments have been described herein, one of ordinary skill in the art will readily appreciate that the exemplary embodiments set forth above are merely illustrative in nature and should not be construed as to limit the claims in any manner. Rather, the scope of the invention is defined only by the appended claims and their equivalents, and not, by the preceding description.

The invention claimed is:

1. A method for fighting forest fires and/or wildfires, the method comprising the steps of:
    airlifting equipment and operators to a location of a fire, at least some of the equipment comprising attachment rings or hooks attached to the equipment for facilitating transport of the equipment by aircraft;
    establishing one or more fire lines at the location of the fire, the one or more fire lines configured to be cleared of vegetation using the equipment so as to slow or stop the progress of the fire;
    establishing one or more work areas at the location of the fire, the one or more work areas configured to be used for processing the vegetation after the vegetation has been cut in the one or more fire lines, the one or more work areas being spaced apart from the one or more fire lines so that one or more work areas are not impacted by the fire;
    cutting down the vegetation along the one or more fire lines by using a first subset of the equipment;
    after the vegetation is cut down along the one or more fire lines, transporting the cut vegetation to a selected one of the one or more work areas using a second subset of the equipment;
    processing and/or storing the cut vegetation in the one or more work areas prior to the cut vegetation being transported off-site for use; and
    transporting the cut vegetation from the one or more work areas to one or more off-site locations so that the cut vegetation is able to be used by consumers for a variety of different applications.

2. The method according to claim 1, wherein the fire being managed and treated by the operators comprises a forest fire, and the step of cutting down the vegetation along the one or more fire lines further comprises cutting down trees along the one or more fire lines using the first subset of the equipment.

3. The method according to claim 2, wherein the first subset of the equipment comprises forestry equipment, the forestry equipment being selected from the group consisting of: (i) one or more feller bunchers for cutting down and collectively grasping cut trees, (ii) one or more grapple skidders for grabbing and moving a bunch of cut trees, (iii) one or more loader forwarders for grabbing and lifting cut trees for transport, (iv) one or more excavators fitted with combination cutter and delimber heads, (v) one or more tractors for moving cut trees, and (vi) combinations thereof.

4. The method according to claim 2, wherein the step of transporting the cut vegetation to the selected one of the one or more work areas further comprises transporting the cut trees to the 2 selected one of the one or more work areas using the second subset of the equipment, the second 3 subset of the equipment being selected from the group consisting of: (i) one or more grapple skidders for grabbing and moving a bunch of cut trees, (ii) one or more loader forwarders for grabbing and lifting cut trees for transport, (iii) one or more tractors for moving cut trees, and (iv) combinations thereof.

5. The method according to claim 2, wherein the step of processing and/or storing the cut vegetation in the one or more work areas further comprises delimbing and cutting the cut trees 2 into sections using a third subset of the equipment, the third subset of the equipment being selected from the group consisting of: (i) one or more limbing machines for removing limbs from the cut trees, (ii) stroke delimbers for removing limbs from the cut trees, (iii) one or more feller bunchers for cutting and collectively grasping cut trees, (iv) one or more grapple skidders for grabbing and moving a bunch of cut trees, (v) one or more loader forwarders for grabbing and lifting cut trees for transport, (vi) one or more excavators fitted with combination cutter and delimber heads, (vii) one or more tractors for moving cut trees, and (viii) combinations thereof.

6. The method according to claim 5, wherein the step of processing and/or storing the cut vegetation in the one or more work areas further comprises grinding tree branches, leaves, and other debris from the cut trees that cannot be used for wood products using one or more woodchippers so as to turn the tree branches, leaves, and other debris into mulch that is able to loaded into trucks, and removed from the one or more work areas.

7. The method according to claim 2, further comprising the step of:
    after the trees are cut down along the one or more fire lines and transported to the one or more work areas, removing the stumps along the one or more fire lines with one or more stump grinding devices so that the ground along the one or more fire lines is able to be more easily plowed.

8. The method according to claim 2, further comprising the step of:
    after the trees are cut down along the one or more fire lines and transported to the one or more work areas, turning over the ground soil along the one or more fire lines using one or more plows so as to bury any remaining vegetation and combustible material to reduce a likelihood of the forest fire advancing beyond the fire line.

9. The method according to claim 1, wherein the fire being managed and treated by the operators comprises a wildfire, and the step of cutting down the vegetation along the one or more fire lines further comprises cutting down ground cover along the one or more fire lines using the first subset of the equipment.

10. The method according to claim 9, wherein the first subset of the equipment comprises mowing equipment, the mowing equipment being selected from the group consisting of: (i) one or more rotary mowers for cutting down the ground cover, (ii) one or more rotary cutters for cutting down the ground cover, and (iii) combinations thereof.

11. The method according to claim 9, further comprising the steps of:
 after the ground cover is cut down along the one or more fire lines, collecting the cut ground cover into rows using one or more hay rakes; and
 forming the cut ground cover into bales using balers so that the bales are able to be easily removed from the one or more fire lines.

12. The method according to claim 11, wherein the step of transporting the cut vegetation to the selected one of the one or more work areas further comprises transporting the bales of the cut ground cover to the selected one of the one or more work areas using the second subset of the equipment, the second subset of the equipment being selected from the group consisting of:
 (i) one or more hay wagons, (ii) one or more flatbed trucks, (iii) another type of transport vehicle capable of transporting the bales of the cut ground cover, and (vi) combinations thereof.

13. The method according to claim 12, further comprising the step of:
 after the bales of the cut ground cover are transported to the one or more work areas, turning over the ground soil along the one or more fire lines using one or more plows so as to bury any remaining vegetation and combustible material to reduce a likelihood of the wildfire advancing beyond the fire line.

14. The method according to claim 13, wherein the fire being managed and treated by the operators comprises a combination of the wildfire and a forest fire; and
 the step of cutting down the vegetation along the one or more fire lines further comprises cutting down trees along the one or more fire lines;
 S the step of transporting the cut vegetation to the selected one of the one or more work areas further comprises transporting the cut trees to the selected one of the one or more work areas; and
 the step of processing and/or storing the cut vegetation in the one or more work areas further comprises delimbing and cutting the cut trees into sections.

15. The method according to claim 1, further comprising the step of:
 transporting firefighters and firefighting equipment to the location of the fire using high mobility multipurpose wheeled vehicles to accelerate the forming of the one or more fire lines at the location of the fire.

* * * * *